United States Patent
Tsukiyama et al.

(10) Patent No.: US 10,845,108 B2
(45) Date of Patent: Nov. 24, 2020

(54) REFRIGERATION DEVICE AND CONTROLLER FOR REFRIGERATION DEVICE

(71) Applicant: Mitsubishi Electric Corporation, Tokyo (JP)

(72) Inventors: Ryo Tsukiyama, Tokyo (JP); Yusuke Arii, Tokyo (JP); Tomotaka Ishikawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/781,565

(22) PCT Filed: Feb. 8, 2016

(86) PCT No.: PCT/JP2016/053612
§ 371 (c)(1),
(2) Date: Jun. 5, 2018

(87) PCT Pub. No.: WO2017/138058
PCT Pub. Date: Aug. 17, 2017

(65) Prior Publication Data
US 2019/0113264 A1  Apr. 18, 2019

(51) Int. Cl.
*F25B 40/02* (2006.01)
*F25B 49/02* (2006.01)
*F25B 1/10* (2006.01)

(52) U.S. Cl.
CPC .............. *F25B 49/027* (2013.01); *F25B 1/10* (2013.01); *F25B 40/02* (2013.01); *F25B 49/022* (2013.01);
(Continued)

(58) Field of Classification Search
CPC ........ F25B 40/02; F25B 49/02; F25B 49/022; F25B 2600/0253; F25B 2600/111;
(Continued)

(56) References Cited

U.S. PATENT DOCUMENTS 4,545,210 A * 10/1985 Lord ........................ F25B 49/02
62/77
4,939,905 A * 7/1990 Manz ........................ F25B 45/00
62/149

(Continued)

FOREIGN PATENT DOCUMENTS

JP   H08-121888 A   5/1996
JP   H09-021570 A   1/1997
(Continued)

OTHER PUBLICATIONS

International Search Report of the International Searching Authority dated Apr. 26, 2016 for the corresponding international application No. PCT/JP2016/053612 (and English translation).

(Continued)

*Primary Examiner* — Jonathan Bradford
(74) *Attorney, Agent, or Firm* — Posz Law Group, PLC

(57) ABSTRACT

A refrigeration device includes a refrigerant circuit sequentially connecting a compressor, a condenser, a reservoir, and a subcooling coil via refrigerant pipes in series, an injection circuit configured to inject part of refrigerant flowing from the condenser to an intermediate pressure part of the compressor, and an injection expansion valve configured to reduce a pressure of refrigerant branched on a downstream side of the subcooling coil. The refrigeration device includes a temperature measurement unit, a pressure measurement unit, and a controller configured to identify a type of refrigerant on the basis of a measured value of the temperature measurement unit and a measured value of the pressure measurement unit, and control at least one of an operating (Continued)

frequency of the compressor, a rotation frequency of a condenser fan, and an opening degree of the injection expansion valve.

4 Claims, 3 Drawing Sheets

(52) U.S. Cl.
CPC . *F25B 2600/0253* (2013.01); *F25B 2600/111* (2013.01); *F25B 2600/17* (2013.01); *F25B 2600/2509* (2013.01); *F25B 2600/2513* (2013.01); *F25B 2700/195* (2013.01); *F25B 2700/21163* (2013.01)

(58) Field of Classification Search
CPC .......... F25B 2600/17; F25B 2600/2509; F25B 2600/2513; F25B 2700/195; F25B 2700/21163
See application file for complete search history.

(56) References Cited

U.S. PATENT DOCUMENTS

| | | | | |
|---|---|---|---|---|
| 5,005,369 | A | * | 4/1991 | Manz ................. B60H 1/00585 62/149 |
| 5,285,647 | A | * | 2/1994 | Manz ..................... F25B 45/00 62/127 |
| 2007/0255451 | A1 | * | 11/2007 | Lewis .................. G05D 7/0682 700/240 |
| 2010/0031681 | A1 | * | 2/2010 | Dolin .................... F25B 41/062 62/225 |
| 2011/0023503 | A1 | * | 2/2011 | Wang ....................... F24F 11/30 62/77 |
| 2014/0053587 | A1 | * | 2/2014 | Arii ....................... F25B 41/043 62/196.1 |

FOREIGN PATENT DOCUMENTS

| | | |
|---|---|---|
| JP | H10-111052 A | 4/1998 |
| JP | H11-118270 A | 4/1999 |
| JP | 2006-275438 A | 10/2006 |
| JP | 2012-189246 A | 10/2012 |
| JP | 2014-119221 A | 6/2014 |
| WO | 2014/199445 A1 | 12/2014 |

OTHER PUBLICATIONS

Office action dated Jun. 4, 2019 issued in corresponding JP patent application No. 2017-566244 (and English translation).
Examination Report dated Jul. 17, 2020 issued in corresponding GB patent application No. 1810498.4.
Office Action dated Sep. 8, 2020 issued in corresponding JP patent application No. 2017-566244 (and English translation).

* cited by examiner

P-H DIAGRAM

TYPE OF REFRIGERANT AND
SATURATED LIQUID TEMPERATURE

| PRESSURE [MPa(A)] | R404A [°C] | R410A [°C] | R32 [°C] |
|---|---|---|---|
| 1 | 16.6 | 7.2 | 6.6 |
| 1.2 | 23.3 | 13.3 | 12.7 |
| 1.4 | 29.2 | 18.8 | 18.1 |
| 1.6 | 34.5 | 23.7 | 23.0 |
| 1.8 | 39.3 | 28.1 | 27.4 |
| 2 | 43.8 | 32.2 | 31.4 |
| 2.2 | 47.9 | 36.0 | 35.2 |
| 2.4 | 51.7 | 39.6 | 38.7 |
| 2.6 | 55.3 | 42.9 | 42.0 |
| 2.8 | 58.6 | 46.0 | 45.1 |
| 3 | 61.8 | 49.0 | 48.0 |
| 3.2 | 64.8 | 51.8 | 50.8 |
| 3.4 | 67.7 | 54.5 | 53.5 |
| 3.6 | — | 57.1 | 56.0 |
| 3.8 | — | 59.5 | 58.4 |
| 4 | — | 61.8 | 60.8 |

REFRIGERATION DEVICE AND CONTROLLER FOR REFRIGERATION DEVICE

CROSS REFERENCE TO RELATED APPLICATION

This application is a U.S. national stage application of International Application No. PCT/JP2016/053612, filed on Feb. 8, 2016, the contents of which are incorporated herein by reference.

TECHNICAL FIELD

The present invention relates to a refrigeration device identifying an arbitrary refrigerant from multiple types of refrigerants to enable efficient operation depending on a type of the refrigerant.

BACKGROUND

In recent years, in respond to the trend to curb global warming, a refrigeration device in which a new refrigerant having a low global warming potential is enclosed has been actively developed. As it is basically impossible for a refrigeration device to detect enclosed refrigerant, when refrigerant that is not specified is enclosed, effective control cannot be performed due to differences in refrigerant properties. Moreover, when multiple types of refrigerants are enclosed, it is difficult to ensure the safety from the standpoint of a withstanding pressure or flammability. Thus, basically, a single type of refrigerant can be enclosed in the refrigeration device. Consequently, when a customer changed the enclosed refrigerant, there is a need to repurchase another refrigeration device having specifications, such as rotation frequency of a compressor and an opening degree of an expansion valve, are appropriately adjusted.

For example, in the following Patent Literature 1, a refrigeration device capable of selecting and using an arbitrary refrigerant from multiple types of refrigerants is disclosed. Specifically, a configuration of the refrigeration device includes a drive current detecting unit detecting a drive current of a compressor, operation state detecting units measuring a pressure and a temperature on a suction side of the compressor, and a pressure and a temperature on a discharge side of the compressor, and a control unit identifying a type of the refrigerant enclosed in a refrigeration cycle on the basis of the detected data from the drive current detecting unit and the operation state detecting units and controlling the compressor to operate at a rotation frequency within a range preset for types of refrigerants.

Moreover, in the following Patent Literature 2, an air-conditioning device configured with an outdoor unit and multiple indoor units that are dedicated units for respective refrigerants and capable of selecting and using an arbitrary refrigerant from multiple types of refrigerants by controlling an operating pressure of the outdoor unit to cause the indoor units to have a designed pressure is disclosed. The operating pressure of the outdoor unit is controlled on the basis of a measured value measured by pressure sensors provided on a suction side and a discharge side of the compressor.

PATENT LITERATURE

Patent Literature 1: Japanese Unexamined Patent Application Publication No. 2012-189246

Patent Literature 2: Japanese Unexamined Patent Application Publication No. 11-118270

The refrigeration device in the above-described Patent Literature 1 is required to calculate a current value, on the basis of the pressure and temperature on each of the suction side and the discharge side of the compressor and the operating frequency of the compressor, for each refrigerant that can be used in the refrigeration device, or obtain the current value for each refrigerant by experiment, and to cause a storage unit provided to a controller or other components to store each current value. Consequently, when a refrigeration device with a different compressor is to be developed, there is a problem in that data corresponding to operation states must be calculated or measured for each possible refrigerant.

Moreover, in the inventions disclosed in the above-described Patent Literature 1 and Patent Literature 2, the pressure is measured by pressure measurement units provided on the suction side and the discharge side of the compressor, effects by an intermediate pressure of the compressor cannot be taken into consideration. Consequently, such a configuration can be applied only to a refrigeration device of a system injecting the refrigerant to a suction side of a compressor. When the configuration is to be applied to a refrigeration device of a system injecting the refrigerant to an intermediate pressure part (a compressor intermediate port), which is ordinarily adopted to a low-temperature refrigeration device, there is a problem in that an arbitrary refrigerant cannot be appropriately identified from multiple types of refrigerants.

SUMMARY

The present invention has been made to solve the above-described problems, and has an object to provide a refrigeration device capable of identifying an arbitrary refrigerant from multiple types of refrigerants and efficiently operating depending on the type of the refrigerant, and in particular, a refrigeration device being adopted to a system of directly injecting the refrigerant to an intermediate pressure part of a compressor, which is ordinarily adopted to a low-temperature refrigeration device, to enable automatic adjustment.

A refrigeration device according to an embodiment of the present invention includes a refrigerant circuit sequentially connecting a compressor, a condenser, a reservoir, and a subcooling coil via refrigerant pipes in series, an injection circuit configured to inject part of refrigerant flowing from the condenser to an intermediate pressure part of the compressor, and an injection expansion valve configured to reduce a pressure of refrigerant branched on a downstream side of the subcooling coil. The refrigeration device includes a temperature measurement unit and a pressure measurement unit provided between the condenser and the reservoir, or between the subcooling coil and the injection expansion valve, and a controller configured to identify a type of refrigerant on the basis of a measured value of the temperature measurement unit and a measured value of the pressure measurement unit, and control at least one of an operating frequency of the compressor, a rotation frequency of a fan provided to the condenser, and an opening degree of the injection expansion valve, depending on the type of the refrigerant.

According to an embodiment of the present invention, in a refrigeration cycle including a reservoir, as the type of the refrigerant is identified on the basis of measured values of a temperature measurement unit and a pressure measurement unit provided between a condenser and the reservoir or between a subcooling coil and an injection expansion valve, by applying a fact that a portion of the refrigeration cycle corresponding to a state of saturated liquid is fixed at the reservoir, it is possible to efficiently operate depending on the type of the enclosed refrigerant without calculating or measuring data corresponding to the operation state for each possible refrigerant.

Moreover, according to an embodiment of the present invention, as the measured values of the temperature measurement unit and the pressure measurement unit provided between the condenser and the reservoir or between the subcooling coil and the injection expansion valve do not depend on the operation state of the compressor, in a system directly injecting the refrigerant to an intermediate pressure part of the compressor (compressor intermediate port), the configuration can be adopted without significant component change, to thereby perform automatic adjustment.

DETAILED DESCRIPTION

Embodiment 1

Figure 1:
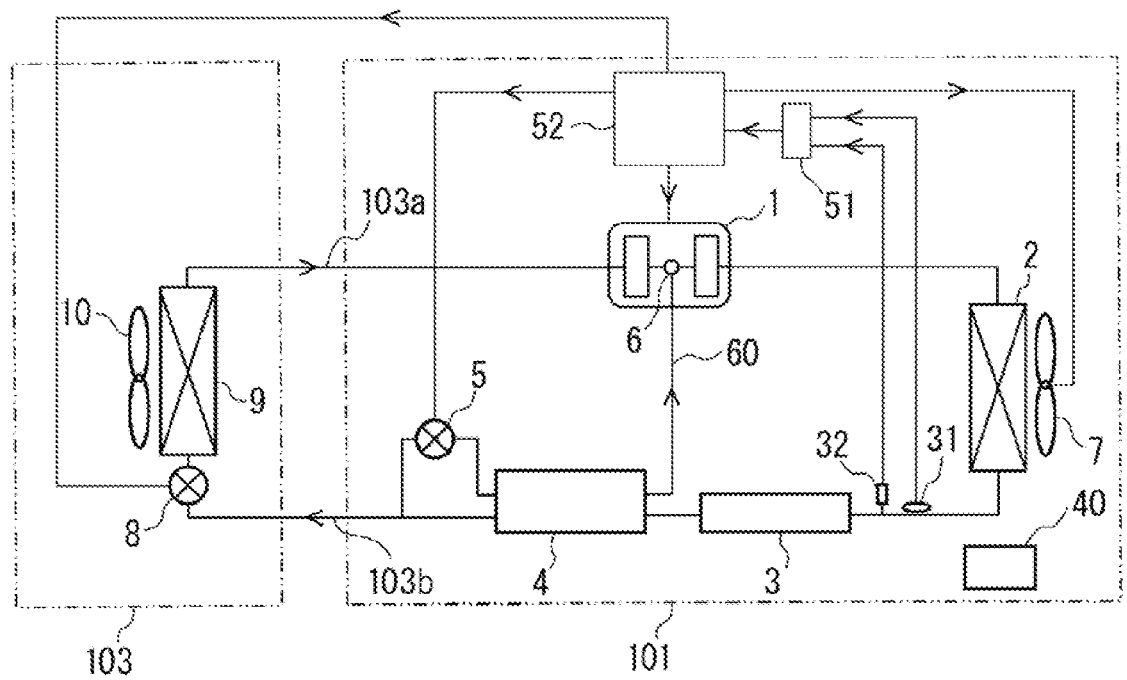
FIG. 1 is a schematic view showing a configuration example of a refrigerant circuit of a refrigeration device according to Embodiment 1 of the present invention.

Hereinafter, a configuration and operation of a refrigeration device according to the present invention will be described with reference to the embodiments shown in the drawings.

Figure 2:
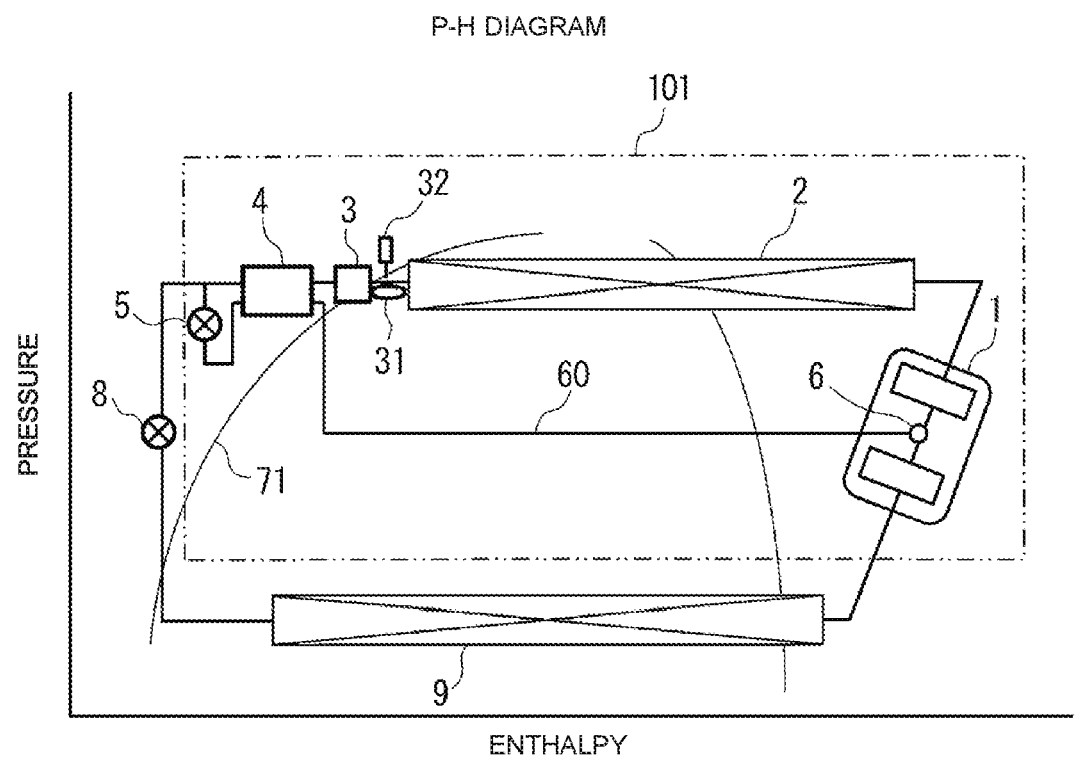
FIG. 2 is a p-h diagram showing an outline configuration of the refrigeration device according to Embodiment 1 of the present invention.
Figures 3, 4:
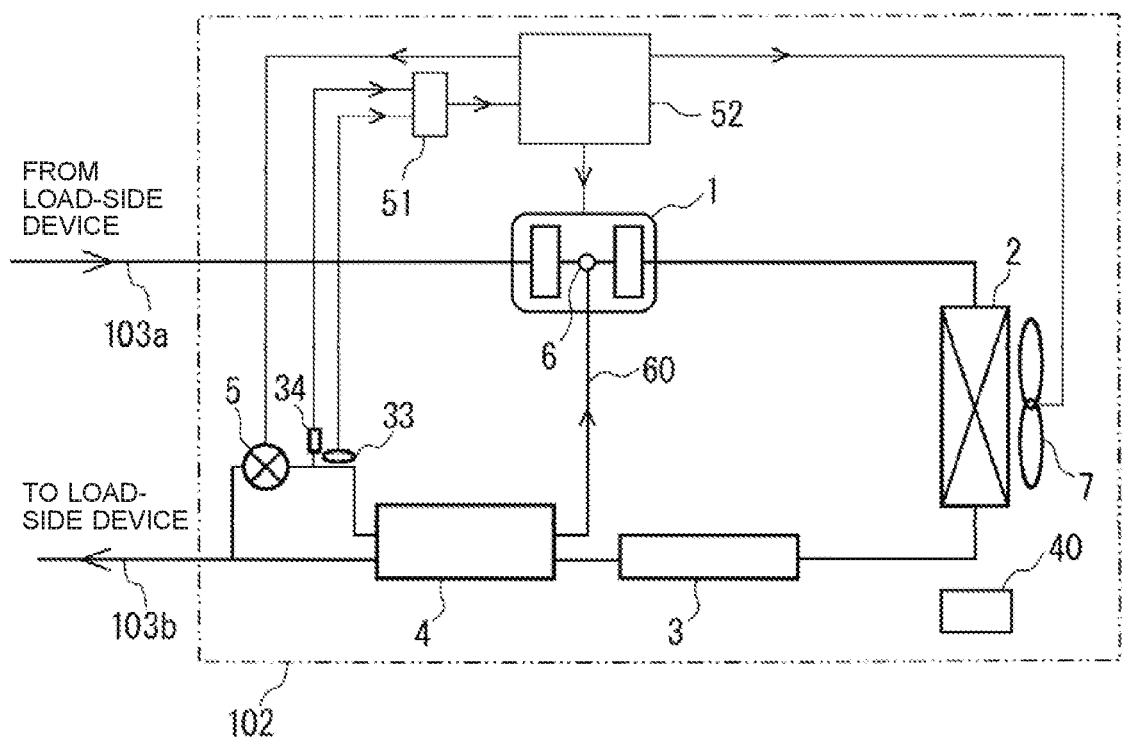
FIG. 3 is a table showing data of a relationship between the types of refrigerants and saturated liquid temperatures in the refrigeration device according to Embodiment 1 of the present invention.
FIG. 4 is a schematic view showing a configuration example of a refrigerant circuit of a refrigeration device according to Embodiment 2 of the present invention.

FIG. 1 is a schematic view showing a configuration example of a refrigerant circuit of a refrigeration device according to Embodiment 1 of the present invention. FIG. 2 is a p-h diagram showing an outline configuration of the refrigeration device according to Embodiment 1 of the present invention. FIG. 3 is a table showing data of a relationship between the types of refrigerants and saturated liquid temperatures in the refrigeration device according to Embodiment 1 of the present invention. Note that, relations between sizes of components in each of the drawings are different from those in actuality in some cases. Moreover, in each of the drawings, components assigned with the same reference signs are the same or corresponding components through all the sentences in the specification. Further, forms of constituents represented in all the sentences in the specification are merely an example, and thereby the constituents are not limited to those described in the specification.

A refrigeration device 101 of Embodiment 1 is, for example, used as an outdoor unit for a load-side device 103 serving as a refrigerator, a freezer, an air-conditioning device, a showcase, or other devices, and constitutes a refrigeration cycle by being connected to the load-side device 103 via extension pipes 103a and 103b. The refrigeration device 101 is configured to be able to use enclosed multiple types of refrigerants and achieves identification of the multiple types of refrigerants to automatically perform effective control. Examples of the multiple types of refrigerants include R404A, R410A, and R32.

The refrigeration device 101 includes a heat-source-side circuit connecting, via refrigerant pipes in series, an inverter compressor (hereinafter, referred to as a compressor 1), a condenser 2 exchanging heat between discharged gas from the compressor 1 with air to condense refrigerant, a reservoir 3 storing liquid refrigerant flowing out of the condenser 2, and a subcooling coil 4 subcooling the liquid refrigerant flowing out of the reservoir 3. Moreover, the refrigeration device 101 includes, in the heat-source-side circuit, an injection circuit 60 for injecting part of the refrigerant flowing out of the subcooling coil 4 to the compressor 1, an injection expansion valve 5 reducing the pressure of the refrigerant branched on the downstream side of the subcooling coil 4, a condenser fan 7 sending air to the condenser 2 for controlling condensing temperature of the refrigerant, and a controller 52 performing integrated control of a whole.

The compressor 1 compresses the refrigerant into a high-temperature and high-pressure state and discharges the refrigerant, and is configured with, for example, a capacity control type having rotation frequency controllable by an inverter circuit. The upstream side of the compressor 1 is connected to an evaporator 9 of the load-side device 103 via the extension pipe 103a and the downstream side of the compressor 1 is connected to the condenser 2. The compressor 1 has a structure in which the refrigerant flowing through the injection circuit 60 can be injected to an intermediate pressure part of the compressor 1 (compressor intermediate port 6). Note that, the compressing system of the compressor 1 can be selected from any of a rotary system, a screw system, a reciprocating system, and a scroll system. Moreover, in the refrigeration device 101 of Embodiment 1 shown in FIG. 1, description is given of a case, in which a single compressor 1 is installed, as an example; however, the refrigeration device 101 is not limited to the example, and multiple compressors 1 may be provided in series or in parallel.

The condenser 2 exchanges heat between the discharged refrigerant from the compressor 1 and a heat medium, such as air and water, to condense and liquefy the refrigerant. The upstream side of the condenser 2 is connected to a discharge side of the compressor 1 and the downstream side of the condenser 2 is connected to the reservoir 3. Note that it is recommended to configure the condenser 2 with, for example, a plate-fin-and-tube heat exchanger capable of exchanging heat between the refrigerant flowing through the condenser 2 and air passing through the fins.

The reservoir 3 separates the refrigerant into liquid refrigerant and gas refrigerant, and the upstream side of the reservoir 3 is connected to the condenser 2 and the downstream side of the reservoir 3 is connected to the subcooling coil 4. In more detail, the reservoir 3 is configured to separate two-phase gas-liquid refrigerant flowing out of the condenser 2 into the liquid refrigerant and the gas refrigerant, supply the liquid refrigerant to the subcooling coil 4, and causes the gas refrigerant to stay in the reservoir 3.

The subcooling coil 4 is configured with, for example, a double-tube coil, and exchanges heat between the refrigerant flowing out of the reservoir 3 and the refrigerant flowing through the injection circuit 60, to thereby subcool the liquid refrigerant flowing out of the reservoir 3. The upstream side of the subcooling coil 4 is connected to the reservoir 3 and the downstream side of the subcooling coil 4 is connected to an electronic expansion valve 8 of the load-side device 103 via the extension pipe 103b.

The injection circuit 60 is connected to the intermediate pressure part of the compressor 1 (compressor intermediate port 6). The injection expansion valve 5 reduces the pressure of the refrigerant branched on the downstream side of the subcooling coil 4 to expand the refrigerant, and is configured with an electronic expansion valve, the opening degree of which is adjustably controlled by the controller 52.

The load-side device 103 includes the electronic expansion valve 8 for reducing the pressure of the refrigerant, an evaporator 9 (load-side heat exchanger) for exchanging heat between the refrigerant, the pressure of which has been reduced by the electronic expansion valve 8, with air to evaporate the refrigerant, and an evaporator fan 10 sending air to the condenser 2 to control an evaporating temperature of the refrigerant.

The electronic expansion valve 8 reduces the pressure of the liquid refrigerant flowing from the subcooling coil 4, and is configured so that the opening degree of the electronic expansion valve 8 is adjustable by the controller 52. The upstream side of the electronic expansion valve 8 is connected to the subcooling coil 4 in the heat-source-side circuit, and the downstream side of the electronic expansion valve 8 is connected to the evaporator 9.

The evaporator 9 exchanges heat between, for example, air to be subject to heat exchange and the refrigerant whose pressure has been reduced by the electronic expansion valve 8, to thereby cause the refrigerant to receive heat from the air, evaporate, and gasify. The upstream side of the evaporator 9 is connected to the compressor 1 in the heat-source-side circuit, and the downstream side of the evaporator 9 is connected to the electronic expansion valve 8.

The evaporator fan 10 sends the air to be cooled to the evaporator 9 to facilitate heat exchange with the refrigerant flowing through the evaporator 9.

Note that, in Embodiment 1 shown in FIG. 1, there are shown an electronic expansion valve 8, an evaporator 9, and an evaporator fan 10; however, for example, multiple combinations of the electronic expansion valve 8, the evaporator 9, and the evaporator fan 10 may be connected by pipes in parallel.

The refrigeration device 101 includes, between the condenser 2 and the reservoir 3, a saturated liquid temperature sensor 31 serving as a temperature measurement unit and a saturated liquid pressure sensor 32 serving as a pressure measurement unit. Both saturated liquid temperature sensor 31 and saturated liquid pressure sensor 32 are, as an example, each configured with a thermistor, and are connected to a refrigerant identification unit 51 included in the controller 52. By storing saturated liquid line data of each possible refrigerant shown in FIG. 3 in advance, the refrigerant identification unit 51 identifies multiple types of refrigerants on the basis of the temperature measured by the saturated liquid temperature sensor 31 and the pressure measured by the saturated liquid pressure sensor 32.

The controller 52 is configured with a microcomputer that can perform integrated control of a whole, or other related components. As shown in FIG. 1, to an input side of the controller 52, the saturated liquid temperature sensor 31 and the saturated liquid pressure sensor 32 are connected, and to an output side of the controller 52, various types of actuators are connected.

The controller 52 stores control patterns corresponding to types and component ratios of refrigerants, and includes a control unit (control program) selecting a control pattern of the specified refrigerant and, depending on the control pattern, controlling at least one of variation in frequency of the compressor 1, variation in the rotation frequency of the condenser fan 7, and variation in pulse of the injection expansion valve 5 to achieve a target condensing temperature preset for each refrigerant.

Moreover, the controller 52 includes a control unit (control program) controlling the compressor 1 within the range of the rotation frequency of the compressor 1 preset for each refrigerant, depending on the type of the refrigerant identified by the refrigerant identification unit 51. In other words, depending on the identified type of the enclosed refrigerant, the controller 52 controls the compressor 1 within the range of the rotation frequency at which abnormal suspension or pipe breakage by increase of discharge pressure and abnormal suspension or failure of the compressor 1 by flow of excess current are not caused. Consequently, the refrigeration device 101 can prevent failure or abnormal suspension of the compressor 1 and operate depending on the type of the enclosed refrigerant.

Moreover, the controller 52 includes a control unit (control program) detecting an abnormal state of the refrigeration device 101 and suspending the compressor 1 at an early stage, and transmitting a detected signal to a notification unit 40 to cause the notification unit to issue an alarm to inform people around the refrigeration device 101 that the refrigeration device 101 is in the abnormal state, when the enclosed refrigerant cannot be identified by the refrigerant identification unit 51. In other words, as the refrigeration device 101 can detect the abnormal state of the enclosed refrigerant in a test operation and inform the people around the refrigeration device 101 of the abnormal state, it is possible to prevent a trouble when the enclosed refrigerant has some problems.

Note that, although detailed illustration is omitted, examples of the notification unit 40 include a buzzer, a lamp, a speaker, or a monitor installed in the refrigeration device 101. However, the notification unit 40 is not limited to the above-described embodiment and can be configured in various forms as long as the notification unit 40 has a configuration capable of informing the people around the refrigeration device 101 of abnormality of the refrigeration device 101.

Further, the controller 52 includes a control unit (control program) controlling at least one of the variation in rotation frequency of the evaporator fan 10 and the variation in pulse of the electronic expansion valve 8 in the load-side device 103 preset for each refrigerant, depending on the type of the refrigerant identified by the refrigerant identification unit 51. The controller 52 is configured to be capable of communicating with the load-side device 103 via a communication unit, and thereby to perform drive control of the evaporator fan 10 of the load-side device 103 at a rotation frequency suitable to the refrigerant and to control the electronic expansion valve 8 at an opening degree suitable to the refrigerant. In other words, with the controller 52, control suitable to the type of the enclosed refrigerant can be automatically selected as a whole refrigeration cycle device including the refrigeration device 101 and the load-side device 103.

The controller 52 controls the above-described actuators to perform operations in the following description.

The flow of the refrigerant in the basic operation of the refrigeration device 101 in Embodiment 1 will be described with reference to FIG. 1.

The gas refrigerant of high temperature and high pressure compressed and discharged by the compressor 1 flows into the condenser 2, and becomes high-pressure liquid refrigerant through heat radiation due to heat exchange with a heat medium supplied to the condenser 2. The airflow rate of the condenser fan 7 for sending air to the condenser 2 is adjusted to have a target value of the condensing pressure of the refrigerant, and thereby the amount of heat radiation from the condenser 2 is adjusted. The high-pressure liquid refrigerant flowing from the condenser 2 flows into the reservoir 3, thus a surplus of the liquid refrigerant enclosed in the refrigeration cycle is stored. The high-pressure liquid refrigerant flowing from the reservoir 3 flows into the subcooling coil 4, and when refrigerant is flowing through the injection circuit 60, the high-pressure liquid refrigerant is subcooled by the refrigerant. The liquid refrigerant flowing from the subcooling coil 4 flows into the load-side device 103, the pressure of the liquid refrigerant is reduced by the electronic expansion valve 8, and in the evaporator 9, the liquid refrigerant is evaporated while cooling an object-to-be-cooled and becomes gas refrigerant again to be sucked into the compressor 1 of the refrigeration device 101.

As described above, in the refrigeration cycle including the reservoir 3, as the degree of subcooling becomes zero in the vicinity of the outlet side of the condenser 2, the measured value of the saturated liquid temperature sensor 31 provided to the outlet of the condenser 2 corresponds to the saturated liquid temperature. Thus, in Embodiment 1, by applying the fact that a portion of the refrigeration cycle corresponding to a state of saturated liquid is fixed at the reservoir 3, the type of the refrigerant is identified on the basis of the measured values of the saturated liquid temperature sensor 31 and the saturated liquid pressure sensor 32 provided between the condenser 2 and the reservoir 3, to thereby control the refrigeration cycle depending on the type of the refrigerant. Note that, for pressure measurement, adopting a method by use of the discharge pressure sensor of the compressor 1, which is installed in many refrigeration devices, can also be considered; however, the pressure cannot be correctly measured due to the pressure loss from the discharge part of the compressor 1 to a location before the reservoir 3. Consequently, in the refrigeration device 101 of Embodiment 1, the refrigerant is identified on the basis of the measured values of the saturated liquid temperature sensor 31 and the saturated liquid pressure sensor 32 provided between the condenser 2 and the reservoir 3.

In the refrigeration cycle shown in FIG. 2, the temperature measured by the saturated liquid temperature sensor 31 and the pressure measured by the saturated liquid pressure sensor 32 are positioned on the saturated liquid line 71. In other words, as the temperature and the pressure on the saturated liquid line 71 have a unique association with each refrigerant, by storing the saturated liquid line data of each possible refrigerant shown in FIG. 3 in the refrigerant identification unit 51 in advance, multiple types of refrigerants can be identified.

When the enclosed refrigerant can be identified by the refrigerant identification unit 51, the controller 52 inputs the refrigerant information. The controller 52 selects a control pattern corresponding to the type and component ratio of the refrigerant identified and specified by the refrigerant identification unit 51, and depending on the selected control pattern, controls at least one of the operating frequency of the compressor 1, the rotation frequency of the condenser fan 7, and the opening degree of the injection expansion valve 5.

In other words, the refrigeration device 101 of Embodiment 1 enables efficient operation depending on the type of the enclosed refrigerant without calculating, as in the conventional refrigeration device, a current value based on the pressure and temperature on each of the suction side and the discharge side of the compressor 1 and the operating frequency of the compressor 1 for each refrigerant that can be used, or obtaining the current value by experiment in advance and storing each current value in the controller 52.

When the enclosed refrigerant cannot be identified by the refrigerant identification unit 51, the controller 52 detects abnormality in the enclosed refrigerant in the test operation, suspends the compressor 1 at an early stage, and issues a notification of the abnormal state.

Specifically, the refrigeration device 101 of Embodiment 1 can prevent situations that are found only after troubles occur, the situations including failure of the compressor 1, insufficient refrigeration capacity, and fire of flammable refrigerant, in the case of enclosing refrigerants other than those configured to be usable, or in the case of mixing of air or initially-enclosed nitrogen.

Moreover, in the refrigeration device 101 of Embodiment 1, as the type of the refrigerant is identified on the basis of the measured values of the saturated liquid temperature sensor 31 and the saturated liquid pressure sensor 32 provided between the condenser 2 and the reservoir 3, identification of the type of the refrigerant is independent of the operation state of the compressor 1. Consequently, in the refrigeration device 101, as shown in FIG. 1, the refrigerant can be identified even in the system injecting the refrigerant to the intermediate pressure part of the compressor 1 (compressor intermediate port 6), which is widely adopted to low-temperature refrigeration devices. Consequently, the refrigeration device 101 can be adopted, without significant component change, to perform automatic adjustment.

Embodiment 2

Next, Embodiment 2 of the refrigeration device according to the present invention will be described with reference to FIG. 4.

FIG. 4 is a schematic view showing a configuration example of a refrigerant circuit of the refrigeration device according to Embodiment 2 of the present invention. Note that, in Embodiment 2, description will be provided to focus on portions different from Embodiment 1, and portions same as those in Embodiment 1 are assigned with the same reference signs and description of the portions will be omitted.

A refrigeration device 102 according to Embodiment 2 is characterized in a configuration including an injection temperature sensor 33 serving as the temperature measurement unit and an injection pressure sensor 34 serving as the pressure measurement unit between the subcooling coil 4 and the injection expansion valve 5. Both injection temperature sensor 33 and injection pressure sensor 34 are, as an example, each configured with a thermistor, and are connected to a refrigerant identification unit 51.

On the basis of saturated liquid temperature data of each refrigerant stored in advance for each usable refrigerant shown in FIG. 3, the controller 52 identifies, by the refrigerant identification unit 51, multiple types of refrigerants from the temperature measured by the injection temperature sensor 33 and the pressure measured by the injection pressure sensor 34. Depending on the type of the refrigerant identified by the refrigerant identification unit 51, the controller 52 controls at least one of the operating frequency of the compressor 1, the rotation frequency of the condenser fan 7, and the opening degree of the injection expansion valve 5 toward the target condensing temperature preset for each refrigerant.

The refrigeration device 102 in Embodiment 2 adopts identification of the normal two-phase state, not identification based on the saturated liquid line 71. Consequently, the refrigeration device 102 is required to broaden the determination range for the refrigerant having a temperature gradient above a certain level, such as some mixed refrigerants, and refrigerants have to be carefully selected as usable refrigerants for the refrigeration device so that determination ranges of refrigerants do not overlap; however, by setting the refrigerants having small temperature gradient to be usable, the refrigeration device 102 can be used without other limitation.

Consequently, in the refrigeration device 102 of Embodiment 2, by applying a fact that a portion of the refrigeration cycle corresponding to a state of saturated liquid is fixed at the reservoir 3, as the type of the refrigerant is identified on the basis of the measured values of the injection temperature sensor 33 and the injection pressure sensor 34 provided between the subcooling coil 4 and the injection expansion valve 5, it is possible to efficiently operate depending on the type of the enclosed refrigerant without calculating or measuring data corresponding to the operation state for each possible refrigerant.

Moreover, in the refrigeration device of Embodiment 2, as the measured values of the injection temperature sensor 33 and injection pressure sensor 34 do not depend on the operation state of the compressor 1, even in a system injecting the refrigerant to the intermediate pressure part of the compressor 1 (compressor intermediate port 6), it is possible to identify the refrigerants.

Embodiment 3

Next, Embodiment 3 of the refrigeration device according to the present invention will be described with reference to FIG. 5.

Figure 5:
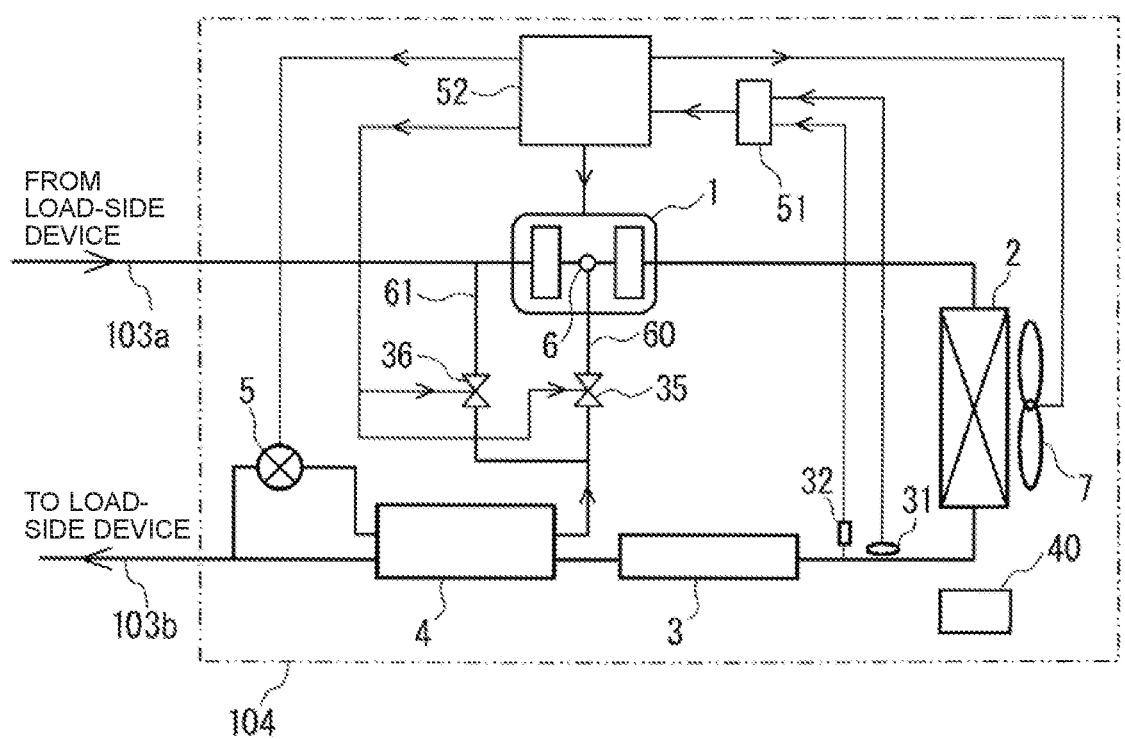
FIG. 5 is a schematic view showing a configuration example of a refrigerant circuit of a refrigeration device according to Embodiment 3 of the present invention.

FIG. 5 is a schematic view showing a configuration example of a refrigerant circuit of a refrigeration device according to Embodiment 3 of the present invention. Note that, in Embodiment 3, description will be provided to focus on portions different from Embodiments 1 and 2, and portions same as those in Embodiment 1 are assigned with the same reference signs and description of the portions will be omitted.

In a refrigeration device 104 according to Embodiment 3, an injection bypass 61 branching from a point between the subcooling coil 4 and the compressor 1 for injection to the suction part (low-pressure part) of the compressor 1 is connected. Moreover, the injection circuit 60 is provided with an injection solenoid valve 35 and the injection bypass 61 is provided with an injection bypass solenoid valve 36. Opening and closing of the injection solenoid valve 35 and opening and closing of the injection bypass solenoid valve 36 are controlled by the controller 52.

The controller 52 includes a control unit (control program) controlling an injection system preset for each refrigerant, depending on the type of the refrigerant identified by the refrigerant identification unit 51.

In other words, the controller 52 can automatically switch between a system injecting the refrigerant to the intermediate pressure part (compressor intermediate port 6) and a system injecting the refrigerant to the suction side of the compressor 1, to thereby select an effective system by controlling opening and closing of the injection solenoid valve 35 and opening and closing of the injection bypass solenoid valve 36 depending on the type of the identified enclosed refrigerant.

Note that the refrigeration device 104 of Embodiment 3 shown in FIG. 5 has a configuration similar to Embodiment 1 in which the multiple types of refrigerants are identified on the basis of the measured values of the saturated liquid temperature sensor 31 and the saturated liquid pressure sensor 32 provided between the condenser 2 and the reservoir 3; however, the identification method is not limited to that of Embodiment 1. For example, as in the refrigeration device 102 of Embodiment 2 shown in FIG. 4, the identification can be performed by the system of identifying the multiple types of refrigerants on the basis of the measured values of the injection temperature sensor 33 and the injection pressure sensor 34 provided between the subcooling coil 4 and the injection expansion valve 5.

The present invention has been described above with reference to the embodiments; however, the present invention is not limited to the above-described configurations of the embodiments. For example, details of configuration or other factors of refrigeration circuit components, such as the flow path configuration of refrigerant (connection by pipes), the compressor, the condenser, and the subcooling coil, are not limited to the details described in the embodiments, and appropriately variable within the technical scope of the present invention. In short, the scope of various modifications, applications, and uses made by those skilled in the art as needed is also included in the gist of the present invention (technical scope).

The invention claimed is:

1. A refrigeration device including a refrigerant circuit sequentially connecting a compressor, a condenser, a reservoir, and a subcooling coil via refrigerant pipes in series, an injection circuit configured to inject part of refrigerant flowing from the condenser to an intermediate pressure part of the compressor, and an injection expansion valve configured to reduce a pressure of refrigerant branched on a downstream side of the subcooling coil, the refrigeration device comprising:
   a temperature sensor and a pressure sensor provided between the subcooling coil and the injection expansion valve; and
   a controller configured to identify a type of refrigerant on a basis of a measured value of the temperature sensor and a measured value of the pressure sensor, and control at least one of an operating frequency of the compressor, a rotation frequency of a fan provided to the condenser, and an opening degree of the injection expansion valve, depending on the type of the refrigerant.

2. The refrigeration device of claim 1, wherein
   the refrigeration device is connected to a load-side device including an evaporator and an expansion valve via refrigerant pipes, and
   the controller is configured to identify the type of refrigerant on a basis of the measured value of the temperature sensor and the measured value of the pressure sensor, and control the opening degree of the expansion valve of the load-side device, depending on the type of the refrigerant.

3. The refrigeration device of claim 1, further comprising an abnormality alarm configured to issue a notification of abnormality in refrigerant, wherein
the controller is configured to identify the type of refrigerant on a basis of the measured value of the temperature sensor and the measured value of the pressure sensor, and
the controller is configured to, when the refrigerant is determined to be unidentifiable, control the abnormality alarm to issue a notification.

4. The refrigeration device of claim 1, further comprising:
an injection bypass branching from a point between the subcooling coil and the compressor, for injecting refrigerant to a suction side of the compressor;
an injection solenoid valve provided to the injection circuit; and
an injection bypass solenoid valve provided to the injection bypass, wherein
the controller is configured to identify the type of refrigerant on a basis of the measured value of the temperature sensor and the measured value of the pressure sensor, and control opening and closing of the injection solenoid valve and opening and closing of the injection bypass solenoid valve, depending on the type of the refrigerant.

* * * * *